Figure 1:
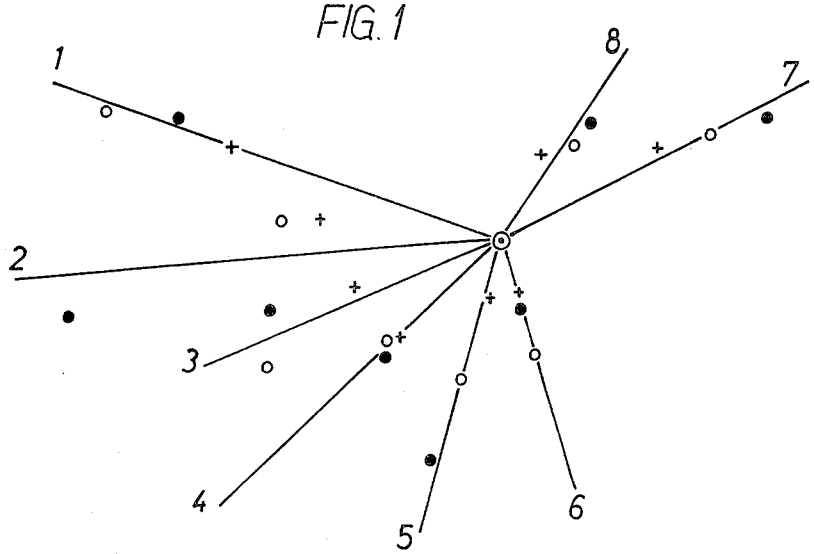

May 24, 1966  F. NISSL ETAL  3,252,835
SENSITIZATION OF ELECTROPHOTOGRAPHIC LAYERS
Filed May 31, 1961  2 Sheets-Sheet 1

INVENTORS:
FRANZ NISSL, WOLF GESIERICH, GERD SCHWARZKOPF.
BY
Connolly and Hutz
their ATTORNEYS 3,252,835
SENSITIZATION OF ELECTROPHOTOGRAPHIC
LAYERS
Franz Nissl, Munich, Wolf Gesierich, Leverkusen, and Gerd Schwarzkopf, Opladen, Germany, assignors to Agfa Aktiengesellschaft, Leverkusen, Germany, a corporation of Germany
Filed May 31, 1961, Ser. No. 113,822
Claims priority, application Germany, June 1, 1960,
A 34,795
4 Claims. (Cl. 117—201)

This invention relates to white photoconductive materials which are used for electrostatic and electrolytic copying, printing and duplicating processes, in particular those in which the spectral sensitivity is increased into the visible range by sensitization and processes for the production of such sensitized electrophotographic materials.

The term "electrostatic copying processes" is understood to mean processes in which an "electrostatic image" is produced on a surface which is made visible by dusting with a suitable toning powder, the adhering toning agent being subsequently fixed by burning it in or by solubilizing. Moreover, liquid developers containing a colored substance may be used which are applied as a finely distributed aerosol or as a liquid. The electrostatic image is produced preferably by electrostatically charging a photoconductive layer which is highly insulating in the dark and then illuminating it with the desired pattern or image causing the charge to flow off at the light-struck areas.

Another method comprises producing a conductivity image on a photoconductive layer by exposure to light, and then utilizing this image for electrolytic development. In this case, a colored substance is deposited electrolytically on the parts of the image which have been rendered more conductive, due to the current flowing there, whereas the insulating areas remain white.

Other processes make use of the conductivity image for spraying on the toning agent in a strong electric field.

Numerous methods for producing photoconductive layers have been described, for example, it is known to disperse white inorganic or organic photoconductive substances in insulating, film-forming binding agents and to cast thin layers of these dispersions onto sheet-like supports which are sufficiently conductive. The binding agents used are hydrophobic compounds having a high specific resistance, preferably silicone resins.

It is further known that the photoconductive substances whose intrinsic sensitivity lies substantially in the UV region, may be sensitized by dyes for the visible spectrum. Suitable dyes for this purpose are, for example, sensitizers of the phenolsulphonphthalein group, phthalein dyes, triphenylmethane dyes and cyanine dyes.

Mostly these compounds are easily soluble in polar solvents only. Since most binding agents are used in nonpolar solvents, such as toluene or xylene, it is usual to dissolve the sensitizing agent in ethanol or methanol before adding it to the mixture of photoconductive substance and binding agent.

Another method consists of coloring the photoconductive substance in a solution of dye, then drying it and mixing the colored material with the binding agent. In both cases, strongly colored layers are produced, since considerable quantities of dyes have to be used for producing sufficient sensitization.

Since preferably white surfaces are required for reproduction and duplicating work, such coloration is a considerable disadvantage. For removing the coloration it has been proposed, to bleach the layers, with light or chemically, after the image has been produced. Although most sensitizers which are deposited on the photoconductor have only a very slight color fastness, both methods would necessitate a hardly permissible expenditure if the bleaching is to be carried to any degree of completion. For example, bleaching by light would require many hours of exposure to sunlight even in the middle of summer.

If, however, bleaching is not carried to completion, the result is a material which is not fast to light, and which would become patchy if accidentally exposed.

It is a principal object of the present invention to provide a process for the production of photoconductive layers which are sufficiently sensitive and have a white surface.

It has now been found that uncolored or nearly uncolored electrophotographic layers sensitized to the visible spectrum and containing zinc oxide as photoconductor can be obtained with the same degree of sensitization if the sensitizing dye in a nonpolar organic solvent that is immiscible with water, has a boiling point below 180° C. and a dielectric constant below 10 (preferably between 1 and 6), and in which the photoconductive substance and dye are insoluble or only soluble with difficulty is allowed to act on the finely divided zinc oxide before the binding agent of the layer is added. Preferably, the zinc oxide and the dye are ground in a ball mill in the presence of the nonpolar organic solvent. Thereafter the sensitized photoconductive substance is dispersed in the solution of the layer-forming binding agent using the same or other suitable solvent.

It has been found according to the method of the present invention that the resulting layers remain practically uncolored, whereas, when using solvents which dissolve the dye (for example, methyl or ethyl alcohol) according to known methods, strongly colored layers are obtained. This result is independent of the concentration of the dye.

The processes which take place in accordance with the invention have not yet been elucidated. It is, however, assumed that the photoconductor adsorbs on its surface a very small quantity of dye, the amount being quite sufficient for sensitization but not enough to discolor the layer.

Thus the term "allowed to act on" is merely to be understood to refer to the way in which the dispersion of the photoconductor and the sensitizing dye is prepared. This dispersion may be accomplished by finely distributing the zinc oxide and sensitizing dye in nonpolar organic solvents—the required properties of which are specified hereinbefore—by means of any type of a mill, e.g. a ball mill, of rapid agitators or the like. Thereafter the mixture should be allowed to stand for some hours at room temperature or should be heated for some hours to a temperature below the boiling point of the organic solvent.

The best conditions for the preparation of the required dispersion may vary from one dye to another. But it is not difficult for anybody skilled in this art to determine by experiment the best method to use for any particular sensitizing dye.

The process according to the invention is not restricted to any special class of dyes or with regard to its chemical structure or physical properties, but is useful for the application of any dye which is capable of sensitizing photoconductive zinc oxide. Furthermore, the invention is not restricted to any special type of zinc oxide, provided the zinc oxide to be used is sufficiently photoconductive, which means that the difference between the dark- and the light-conductivity should be sufficient for electrophotographic purposes.

FIGURE 1 shows a number of examples of the distance from the "white point" WP in the CIE-system obtained by different methods of adding the dye. The measurements were obtained with an Elrepho of Karl Zeiss, Oberkochen, using colorimeter filters x y z and calculated according to DIN 5033. The points marked with a cross are obtained by the method according to the present invention. Measurements made with layers in which ZnO was colored with an alcoholic dye solution and dried before dispersion in silicone resin are entered as black dots. The circles represent measurements obtained with emulsions in which the sensitizer was added in concentrated alcoholic solution to the silicone-ZnO dispersions and distributed in the latter in a ball mill. In FIGURE 1, measurements have been made with the following dyes:

1=Malachite green, Color Index 4200
2=Methylene blue, Color Index 52015
3=Bromophenol blue
4=Chlorophenol red
5=Bengal pink, Color Index 45435
6=Bromocresol green
7=Acridine orange, Color Index 46005
8=Bromocresol purple.

It is readily apparent from FIGURE 1 that layers obtained by the process of the invention have the smallest distance from the white point for all the dyes tested. The amount of sensitizer that was added was chosen in such a way that for a given dye the same sensitization was obtained. Thus, although the concentration of the sensitizing dye may vary, the degree of sensitization is the same at all tests. The measurements of sensitization has been accomplished according to the following method:

The sensitivity of electrophotographic papers is the greater, the higher the speed with which the electrostatic charge drains off at a given intensity of illuminaiton, i.e., the smaller the time constant of decay, the greater the sensitivity. If the charge is plotted logarithmically on a linear time axis, the time constant is given by the slope of the resulting curve; the time constant is smaller as the inclination of the curve is greater. To obtain the spectral sensitivity, the decay of the charge on the sensitized paper was measured while the latter was illuminated simultaneously with light from different regions of the spectrum using conventional filters for the blue, green and red region of the visible spectrum and interference filters for the yellow region.

To obtain the same sensitization for the different methods, the quantity of dye was varied until the decay curves for the different color regions had the same inclination for all sensitization methods.

Figure 2:
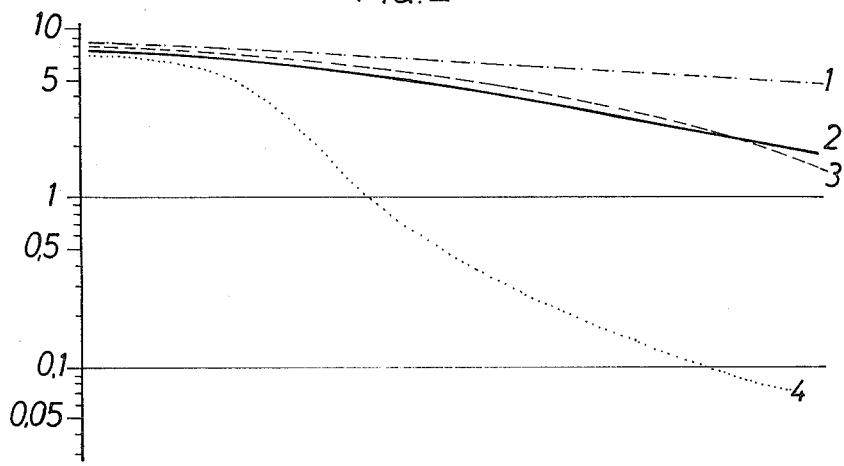
Figure 3:
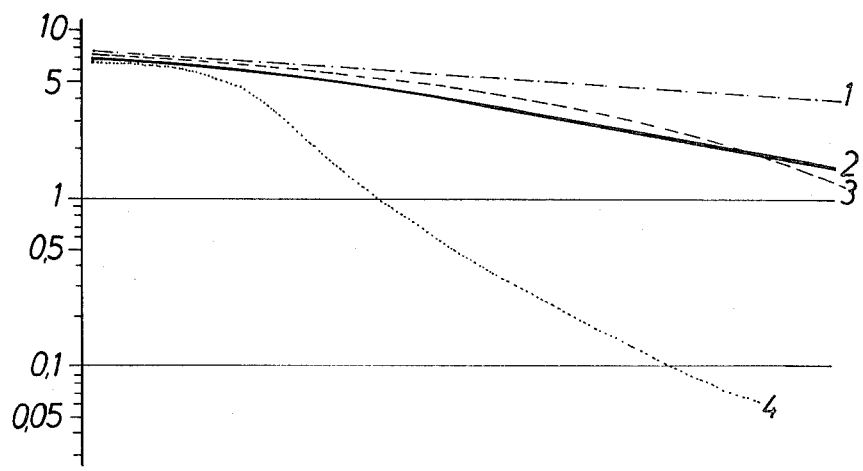
Figure 4:
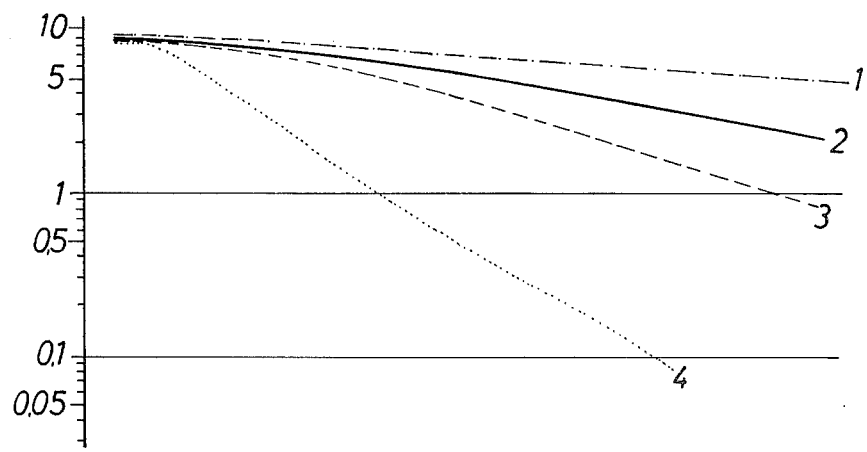

FIGURES 2-4 show the decay curves for the different methods of dye addition when bengal pink was used. The curves were obtained with layers for which the distance from the white point is indicated in FIGURE 1. The different figures are interpreted as follows:

FIGURE 2 shows the decay curves using sensitization according to the invention;

FIGURE 3: The zinc oxide was colored with an alcoholic solution of the dye and dried before dispersion in silicone resin;

FIGURE 4: The concentrated, alcoholic solution of the dye was added to the silicone resin-ZnO dispersion and distributed therein by means of a ball mill.

In FIGURES 2-4, the curves 1-4 show the decay of the charge when illuminated with light of different colors, namely red, blue, yellow and green. It can be clearly seen that in all three cases there is the same degree of sensitization. In some cases, however, the sensitization regions in the various processes are slightly shifted to the other wave lengths.

The following dyes are given as examples of suitable sensitizers:

Fluoresceine, Color Index 45350
Eosine, Color Index 45380
Bengal pink, Color Index 45435
Malachite green, Color Index 42000
Crystal violet, Color Index 42555
Methyl green, Color Index 42590
Cryptocyanine
Pinacyanol
Methylene blue, Color Index 52015
Acridine orange, Color Index 46005
Methylene green, Color Index 50431
Alizarine red S, Color Index 58005
Quinizarin, Color Index 58050
Phenolsulphonphthalein, according to German Patent No. 1,090,093.

Suitable nonpolar solvents immiscible with water are given in the following table:

TABLE

*Examples of suitable solvents*

|  | Dielectric constant | Boiling point |
| --- | --- | --- |
| Benzene | 2.28 | 80.12 |
| Toluene | 2.379 | 110.8 |
| o-Xylene | 2.568 | 144 |
| m-Xylene | 2.374 | 139 |
| p-Xylene | 2.27 | 138 |
| Ethylbenzene | 2.412 | 136.15 |
| Cumene | 2.38 | 152.4 |
| Mesitylene | 2.27 | 164.6 |
| Pinene | 2.6 | 154 |
| Terpinene | 2.7 | 173-4 |
| Limonene | 2.3 | 177 |
| 1-pentene | 2.1 | 39-40 |
| Cyclopentane | 1.965 | 49.5 |
| n-Pentane | 1.84 | 36.2 |
| 2-methylbutane | 1.843 | 28 |
| Cyclohexene | 2.22 | 83.3 |
| Cyclohexane | 2.03 | 80.8 |
| n-Hexane | 1.89 | 68.6 |
| 1-heptene | 2.05 | 93.6 |
| n-Octane | 1.948 | 125.8 |
| n-Nonane | 1.972 | 150.6 |
| n-Decane | 1.991 | 174 |
| Carbontetrachloride | 2.24 | 76.7 |
| Bromoform | 4.39 | 149.6 |
| Chloroform | 4.8 | 61.21 |
| Dibromomethane | 7.77 | 96.5 |
| Dichloromethane | 9.08 | 41.6 |
| Iodomethane | 7.0 | 42.4 |
| Trichloroethylene | 3.4 | 87.2 |
| o-Chlorobenzene | 9.93 | 172 |
| m-Chlorobenzene | 5.04 | 179 |
| o-Chlorotoluene | 4.45 | 159.5 |
| m-Chlorotoluene | 5.55 | 161.6 |
| p-Chlorotoluene | 6.08 | 162 |
| Diethyl ether | 4.34 | 34.6 |
| Divinyl ether | 3.9 | 39 |
| Dipropyl ether | 3.39 | 91 |
| Thiophene | 2.76 | 84 |
| Piperidine | 5.8 | 106 |

Any combination of dye and solvent in which the solvent is not or is only slightly colored is suitable.

A large variety of film-forming synthetic materials may be used as binding agents for the photoconductive substances, for example: cellulose, cellulose esters, cellulose ethers, polyvinyl chloride, polyurethanes, polyesters, polyamides, polycarbonates or silicone resins. Instead of using paper as carrier, films, fabrics or plates of conductive material or of material coated or impregnated with conductive material may be used.

*Example 1.*—100 g. of zinc oxide, 8 mg. of bengal pink and 100 cc. of toluene are shaken in a ball mill for ½ hour. This is then left to stand for 24 hours. Thereafter 65 g. of a 60 percent solution of a silicone resin according to Example 1 of German Patent No. 853,351 in toluene are added and ground again for 1½ hours. Said mixture is cast onto conductive paper raw material in conventional manner and dried. Nearly color-free layers are obtained, which are sensitive in the visible region of the spectrum. Instead of using 8 mg. of bengal pink, equally satisfactory results may be obtained with the following dyes:

4 mg. of pinacyanol  
6 mg. of methylene blue  
12 mg. of acridine orange  
8 mg. of bromophenol blue  
6 mg. of bromocresol green 6 mg. of bromocresol purple  
12 mg. of chlorophenol red  
10 mg. of malachite green  
10 mg. of crystal violet

*Example 2.*—100 g. of zinc oxide, 8 mg. of bengal pink and 100 cc. of toluene are shaken in a ball mill for ½ hour and heated for 8 hours at 80° C. After cooling, it is dispersed in the same binding agent as in Example 1, cast onto conductive paper and dried.

*Example 3.*—100 g. of zinc oxide, 100 cc. of toluene and 12 mg. of acridine orange are ground for ½ hour. After 12 hours at room temperature, 60 g. of a copolymer consisting of equal parts by weight of n-butyl methacrylate and isobutyl methacrylate as a 50 percent solution in toluene is added. Further processing is performed as described in Example 1.

*Example 4.*—100 g. of zinc oxide, 150 cc. of toluene and 10 mg. of bromocresol purple are ground for ½ hour, heated for 8 hours at 90° C. and then slowly cooled for 8 hours. Thereafter 90 g. of a styrene-butadiene copolymer with a softening point at 50° C., as a 30 percent solution in toluene, are added. Further processing is performed as indicated in Example 1.

*Example 5.*—100 g. of zinc oxide, 100 cc. of xylene and 5 mg. of methylene grey are ground for ½ hour in a ball mill. Thereafter 112 g. of a polystyrene solution in toluene (35 percent) are added. Further processing is accomplished as indicated in Example 1.

*Example 6.*—100 g. of zinc oxide, 100 cc. of toluene, 8 mg. bengal pink, 10 mg. malachite green and 5 mg. of acridine orange are shaken for ½ hour in a ball mill. Further processing is performed as described in Example 1.

It is clear to those skilled in the art that various types of sensitizing dyes may be used in place of the dyes described. Further suitable dyes are described in Belgian Patents No. 585,555, page 12, 585,507, page 6, 585,450, page 6, 585,419, page 10 or 576,841, page 10.

What is claimed is:
1. A process for the production of a sensitized electrophotographic material which comprises (a) mixing a dispersion consisting essentially of a sensitizing dye, photoconductive zinc oxide and a nonpolar organic solvent that is immiscible with water, has a boiling point below 180° C., and a dielectric constant below 10, and in which both the zinc oxide and the sensitizing dye are at least difficultly soluble, (b) thereafter mixing the said dispersion with a non-polar solution of a film-forming insulating binding agent, (c) casting the latter mixture on to a sheet-like conductive support and drying the same, thereby forming a layer of the said binding agent containing photoconductive zinc oxide that is sensitized by the said sensitizing dye.

2. A process as defined in claim 1 in which the dispersion of the sensitizing dye and the photoconductive zinc oxide in the nonpolar organic solvent is prepared by mixing the two together in a ball mill.

3. A process as defined in claim 1 in which the dispersion of the sensitizing dye and the photoconductive zinc oxide in the nonpolar organic solvent is heated to just below the boiling point of the solvent before the solution of the film-forming binding agent is added.

4. A process as defined in claim 1 in which the nonpolar organic solvent is toluene and the sensitizing dye is bengal pink and the binding agent is a silicone resin.

References Cited by the Examiner
UNITED STATES PATENTS

| | | | |
|---|---|---|---|
| 3,003,870 | 10/1961 | Jarvis et al. | 96—1 |
| 3,047,384 | 7/1962 | Jones et al. | 96—1 |
| 3,051,569 | 8/1962 | Sugarman et al. | 96—1 |
| 3,052,540 | 9/1962 | Greig | 96—1 |
| 3,079,253 | 2/1963 | Greig | 117—17.5 X |

WILLIAM D. MARTIN, *Primary Examiner.*

H. N. BURSTEIN, *Examiner.*

N. G. TORCHIN, S. W. ROTHSTEIN,
*Assistant Examiners.*